(12) United States Patent
Roach

(10) Patent No.: US 8,869,369 B1
(45) Date of Patent: Oct. 28, 2014

(54) BLADE CHANGE CARRIER DEVICE

(71) Applicant: Jacob J Roach, Jonesboro, AR (US)

(72) Inventor: Jacob J Roach, Jonesboro, AR (US)

(*) Notice: Subject to any disclaimer, the term of this patent is extended or adjusted under 35 U.S.C. 154(b) by 0 days.

(21) Appl. No.: 13/841,041

(22) Filed: Mar. 15, 2013

(51) Int. Cl.
*B62B 7/00* (2006.01)
*A01D 34/73* (2006.01)

(52) U.S. Cl.
CPC .................................. *A01D 34/733* (2013.01)
USPC ............. 29/426.5; 83/66; 83/698.41; 30/276; 56/295; 29/267; 29/426.1

(58) Field of Classification Search
USPC ............. 30/276; 56/295, 157, 255, 256, 17.5, 56/12.7, 16.7, 17.1; 83/698.41, 698.11, 83/663, 666, 665; 29/267, 426.1, 426.5, 29/426.6
See application file for complete search history.

(56) References Cited

U.S. PATENT DOCUMENTS

| | | | |
|---|---|---|---|
| 2,875,569 A | 3/1959 | Sauer | |
| 3,430,461 A | 3/1969 | Boylan | |
| 3,877,146 A | 4/1975 | Pittinger | |
| 4,586,257 A | 5/1986 | Rittenhouse | |
| 4,657,428 A | 4/1987 | Wiley | |
| 4,730,952 A | 3/1988 | Wiley | |
| RE32,730 E | 8/1988 | Wick | |
| 5,205,693 A * | 4/1993 | Fuller et al. | 411/354 |
| 5,575,071 A | 11/1996 | Phillips et al. | |
| 2,822,657 A | 2/1997 | Chaffee | |
| 5,622,035 A | 4/1997 | Kondo et al. | |
| 5,946,895 A | 9/1999 | Martens | |
| 6,205,755 B1 | 3/2001 | Bontrager et al. | |
| 6,260,281 B1 | 7/2001 | Okumura et al. | |
| 7,775,026 B2 * | 8/2010 | Bever | 56/255 |
| 7,784,254 B2 * | 8/2010 | Bever | 56/255 |
| 2005/0252010 A1 | 11/2005 | Freeman | |
| 2007/0169353 A1 | 7/2007 | Wu | |

* cited by examiner

*Primary Examiner* — David Bryant
*Assistant Examiner* — Jason L Vaughan
(74) *Attorney, Agent, or Firm* — Joe D. Calhoun

(57) ABSTRACT

The invention is essentially a quick-change blade carrier for a blade mounted to a rotary drive shaft (such as on a mower) has an internally threaded bore. The carrier includes a housing linked by its cap to the rotary drive shaft, and enclosing a blade-locking member having a blade-locking tip downstanding from its underside; the device also includes a locking means (such as a compression spring) to bias the blade-locking member (and tip) downward through a center hole in the blade held within a channel in the bottom of the housing.

14 Claims, 17 Drawing Sheets

BLADE CHANGE CARRIER DEVICE

CROSS-REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

The present invention generally relates to the field of rotary driven blades, and devices making it easier and faster to change blades. More particularly, this invention relates to a carrier fastened to the motor-driven rotary drive shaft of a machine, such as a lawn mower; the carrier holds the blade in a manner that is secure in the locked configuration, but which can readily unlocked for removal of the blade and replaced with another blade.

(2) Description of Related Art Including Information Disclosed Under 37 CFR 1.97 and 1.98.

Although carriers for blades are generally known in the field, such carriers are usually for reciprocating saws and other similar devices, and such carriers typically address only the blade-changing aspect without addressing the need to do with a device having both strength and durability while also being easily operated by somebody without requiring specialized tools, training, strength or an inordinate amount of time.

U.S. Pat. No. 3,877,146 issued to Pittinger discloses a blade holder having a blade with a central circular hole, a hub or cylindrical body, a blade locating means, and elastically deformable projections or fingers securely holding the blade; the blade may be released by pivoting it about the blade locating means on the holder. The holder is connected with the drive shaft, and holds the blade for rotation. The retaining fingers are formed integrally with the holder. As the blade is rotated from the assembly position, the opposite half-sections of the blade slide under the retaining fingers until they abut near the main body of the holder. As the blade is turned to the locking position, a slight torque must be applied to force it under the raised area by slightly deforming the retaining fingers. Each raised area acts as a detent mechanism.

U.S. Pat. No. 2,875,569 issued to Sauer discloses a blade mounting device for a lawn mower having a drive shaft that rotates a flexible blade, the device having the blade flexibly attached by a spring to a face plate having a blade supporting structure that is secured to the drive shaft. The blade includes a protrusion that is engageable with the wall portion of the face plate. When the blade is assembled to the face plate, the headed screw extends through the cap, the coil spring, the blade and the face plate, and is threaded coaxially into the end of the shaft with the coil spring between the blade and the head of the screw. The spring normally holds the blade against the face plate to keep the protrusions in the recesses or holes in the face plate and against the wall portion of the face plate.

U.S. Pat. No. 4,586,257 issued to Rittenhouse discloses a blade holder including a holder body connected to a rotary drive shaft. The holder body has a wide and flat outer (lower) face upon which the specialized blade is secured between tabs. The blade essentially slides into two guide grooves along the side edges of the flat outer face, held in place by lip tabs. A central engaging means engages a circular central hole in the blade. The engaging means includes an engaging pin, and a compression spring which biases the engaging pin outward (downward) from the flat outer face and through the blade hole. The blade can be easily removed from the holder by pressing the engaging pin (which is exposed on the bottom of the device) inward against the compression spring and sliding the blade until tabs are between lip tabs, so that the blade can be lifted away from the holder.

None of the aforementioned references discloses: (a) a housing having a bottom and a false floor and a sidewall slot-opening forming a channel therebetween holding the blade; and (b) a housed disk having a tip downstanding from its floor, and (c) a housed compression spring biasing the blade-engaging tip through an opening in the housing's false floor and through a center hole in the blade to lock it within the channel.

BRIEF SUMMARY OF THE INVENTION

Although the present invention has several embodiments, the version generally described is essentially a device facilitating removal and mounting of a blade having an axial mounting hole for attachment to a rotary drive shaft. The device generally comprises (includes) a housing having a bottom, a false floor defining an axial opening having the configuration of the blade's mounting hole. The housing also may have a sidewall slot-opening defining a channel accepting the blade between the housing bottom and false floor; the axial opening defines a passageway into the channel. The device also generally includes a housed blade-lock member having an axial tip snugly acceptable to the axial opening. When the blade-lock member is in a raised position, the tip extends downwardly only to the axial opening, without protruding into the channel enough to inhibit insertion of a blade, and without protruding into the blade's axial mounting hole to inhibit removal of the blade from the channel. When the blade-lock member is in a lowered position, the tip extends downwardly substantially into the channel and through the blade's axial hole, to prevent it from being removed. The housing's housing sidewall may further include a lever port for accepting a lever (such as a screw driver) for raising the blade-lock member to the raised position. The device also generally includes a locking means for biasing the blade-lock member's axial tip downward, and locking the blade into the device. The device has a cap having a fastening means linking the device to the rotary drive shaft, so that rotation of the drive shaft likewise rotates the housing and blade locked therein.

One primary object of the present invention is to provide a blade-change carrier device that makes it easier and faster to change blades.

Another primary object of the present invention is to provide a carrier device that is sturdy enough to withstand the rigors of the rotary blade environment, while facilitating the removal and re-installation of blades in the field without requiring specialized tools, training, strength or an inordinate amount of time.

Other objects will be apparent from a reading of the written description disclosed herein, together with the claims.

Figure 1:
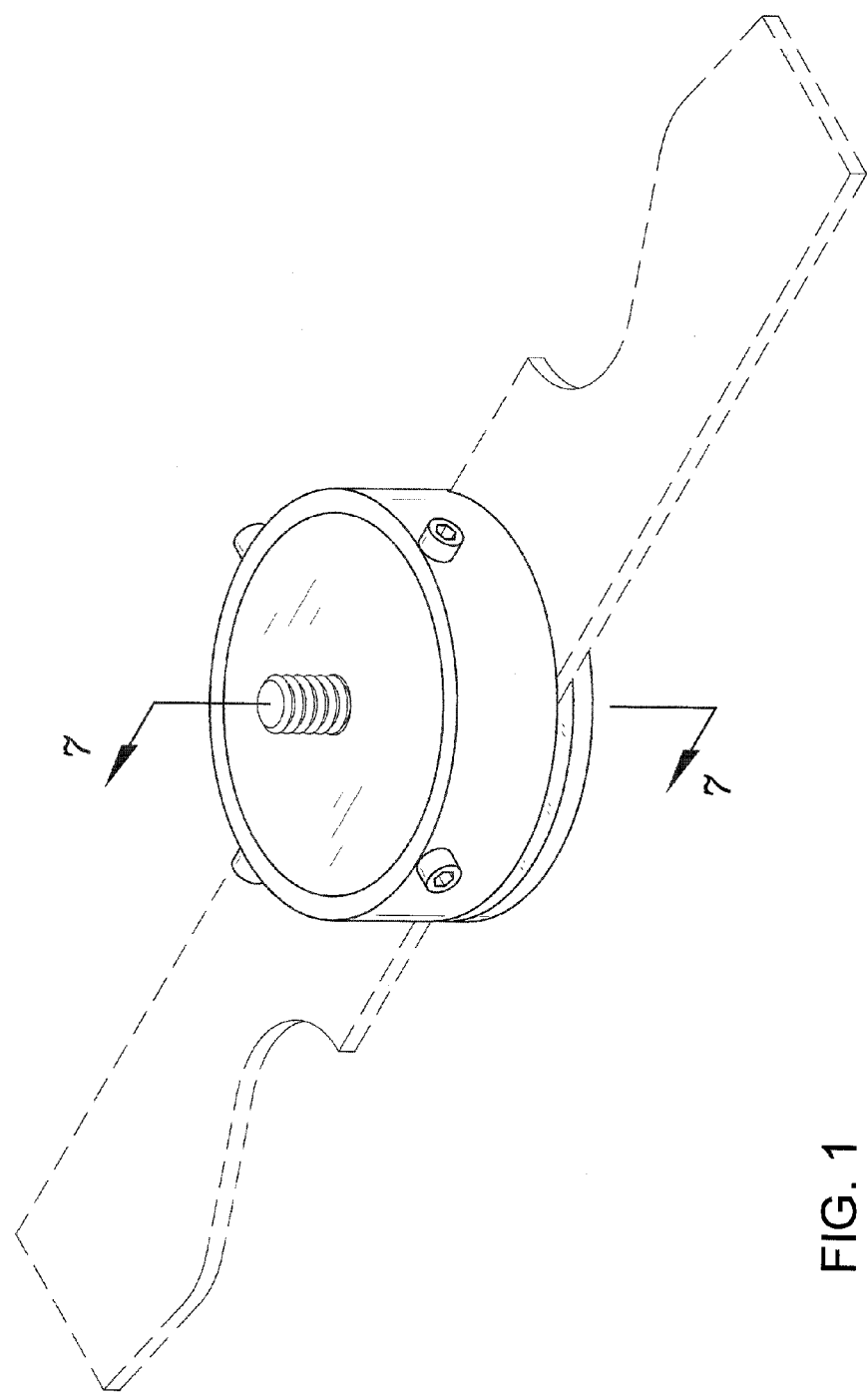
FIG. 1 depicts a perspective view of one representative embodiment of the blade change carrier; the blade depicted in phantom is not claimed, and it is not usually locked within the channel before the carrier is fastened to the drive shaft rotating the blade. In this embodiment, the externally threaded drive-bolt extending upwardly through the axial opening is screwed into the internally threaded bore of the drive shaft rotating the blade.
Figure 2:
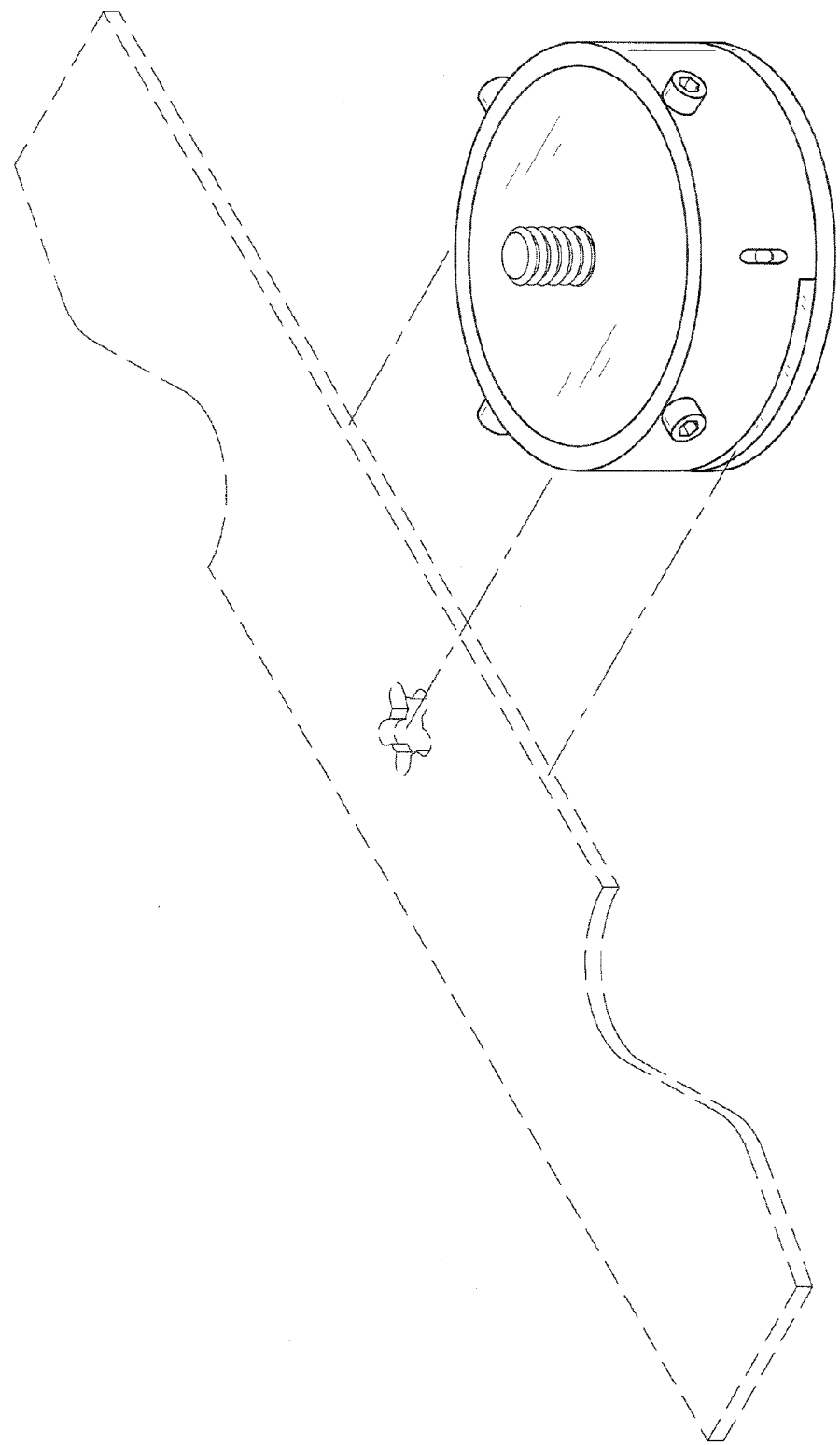
FIG. 2 depicts the carrier of FIG. 1, rotated 90° counter-clockwise, with the blade removed and showing the elongated hole in the housing sidewall, acceptable to a lever-like object to leverage the downwardly spring-biased disk (with downstanding tip) upwardly against the compression spring to withdraw the tip from the blade's mounting hole.
Figure 3:
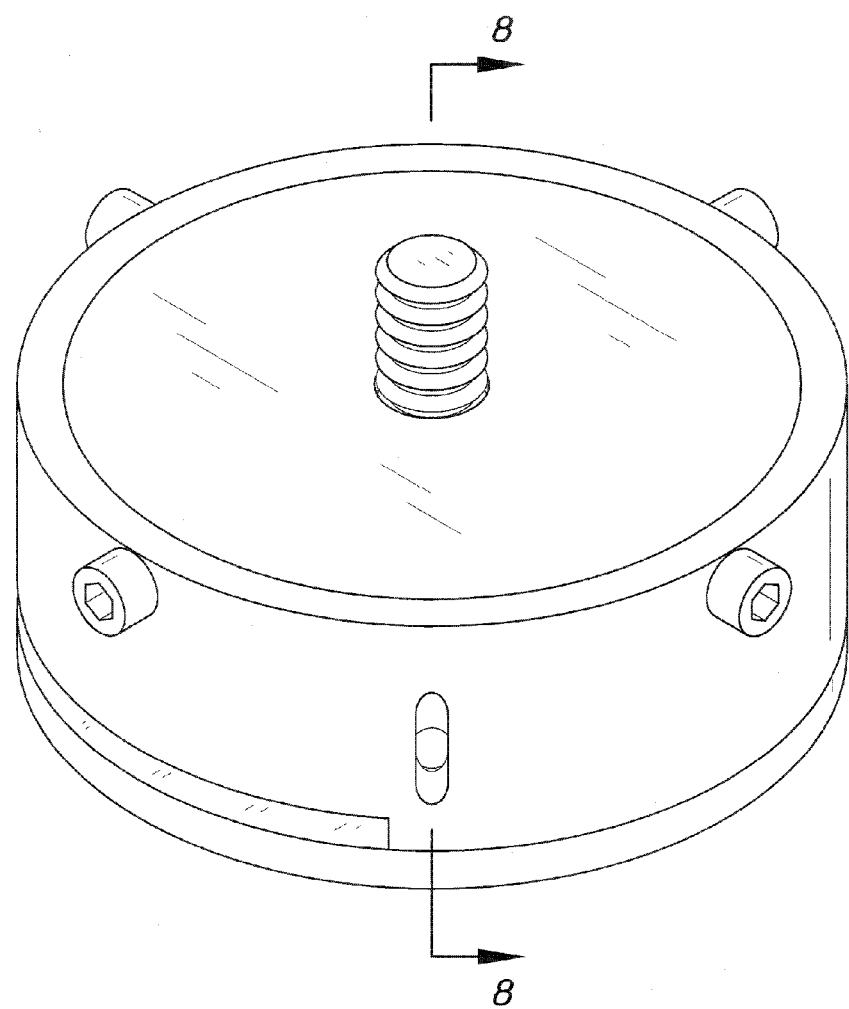
FIG. 3 depicts a close-up of the carrier of FIG. 2.
Figure 4:
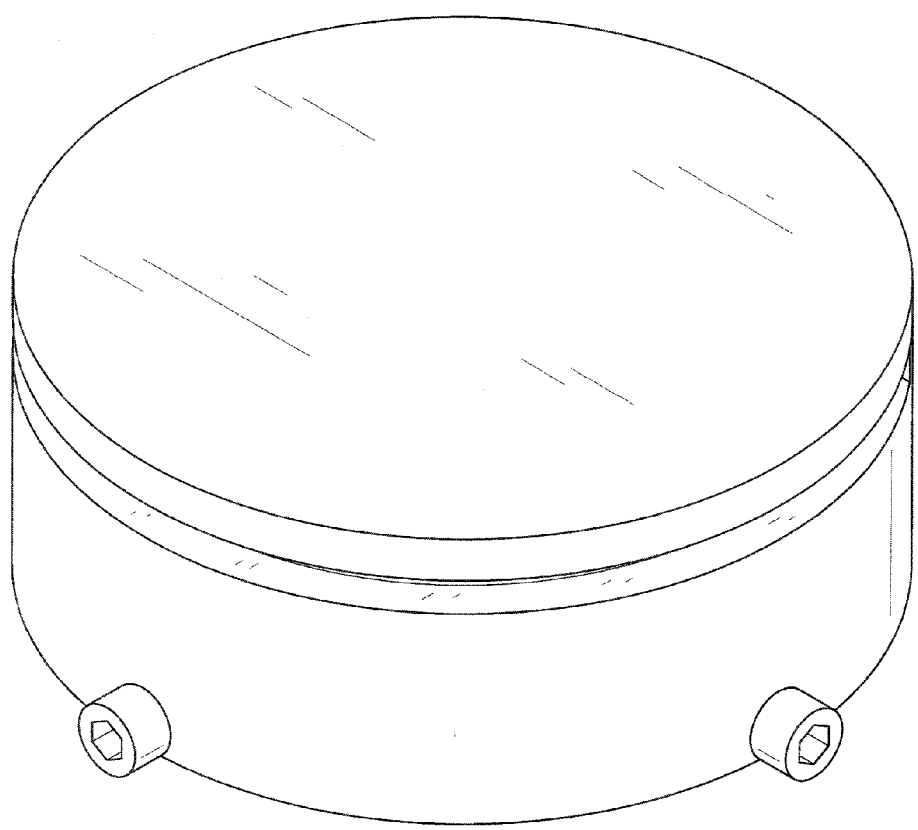
FIG. 4 depicts a bottom perspective view of the carrier of FIG. 2.
Figure 5:
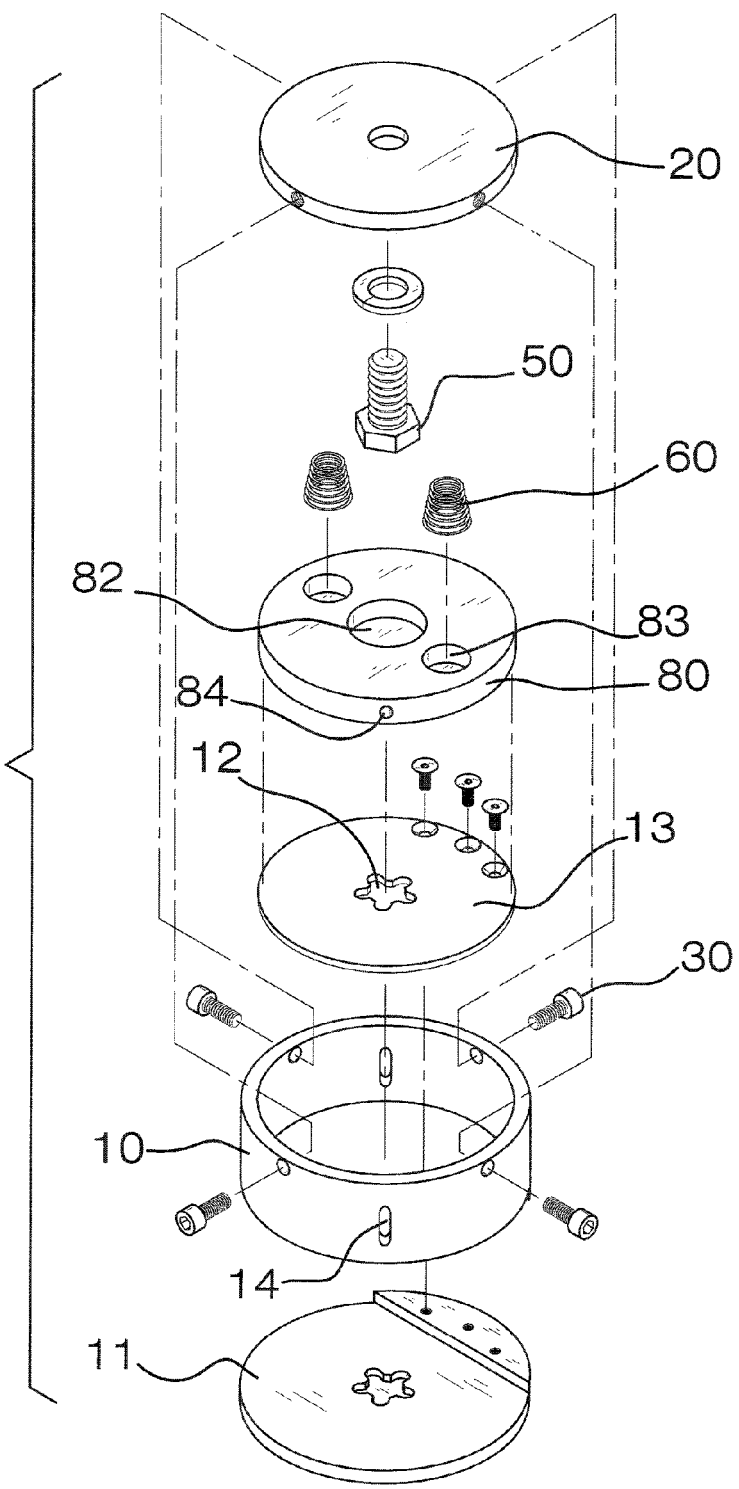
FIG. 5 depicts an overhead exploded view of the carrier of FIG. 2, showing the cylindrical housing (10) having a bottom (11) and a star-shaped opening (12) in a false floor (13), and a lever port (14) also depicted are the cap (20) (with anchor bolts 30), central drive-bolt (50) (impaling the compression spring (60)); also depicted are disc (80) having an axial well (82) between a pair of opposite indentations (83), and having a lever bore (84) for accepting a lever for leveraging the disk upward to its raised position.
Figure 6:
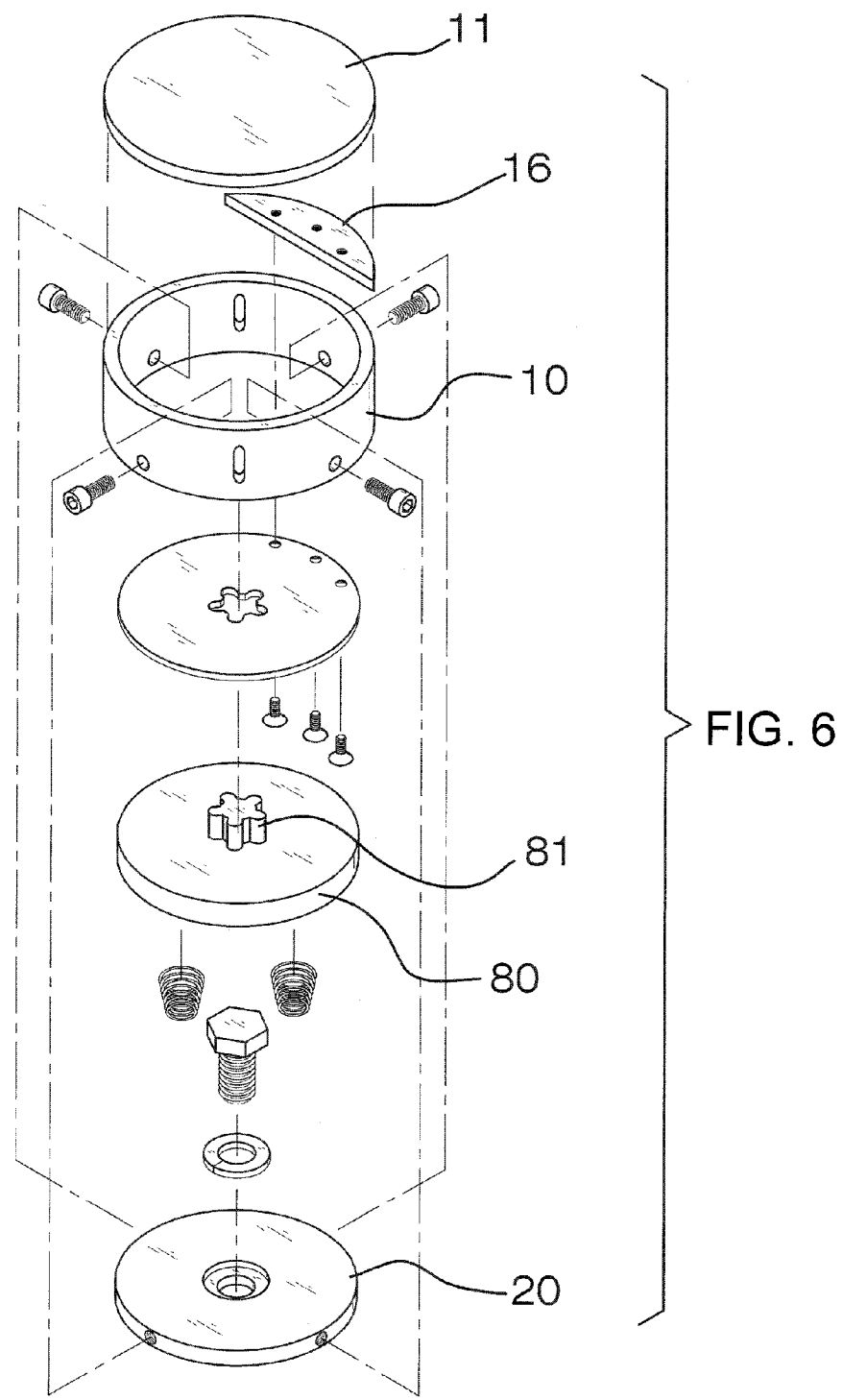
FIG. 6 depicts an exploded view from below the carrier of FIG. 2, including the disk's downstanding star-shaped tip (81), and the support ledge (16) between the housing's false floor and bottom. Although depicted as separate elements, the bottom and ledge and false floor do not have to be separate elements. For example if the housing starts as a closed-bottom cylinder, and the blade channel is made by a sidewall cut slightly above the bottom, the ledge may be an integral portion of either the underside of the false floor or the upper surface of the bottom, before being anchored within the cylinder. Alternatively, if the housing starts with a cylinder open at both ends, the ledge may be an integral portion of the upper surface of the bottom, which is then affixed to the cylinder before the false floor is attached thereto. The overriding intent is to construct a structure that has a sturdy barrier against the outer environment around the rotating blades, while the false floor maintains comparable structural durability in the presence of a strong locking and unlocking mechanism that can be actuated without specialized tools, training, strength or an inordinate amount of time.
Figure 7:
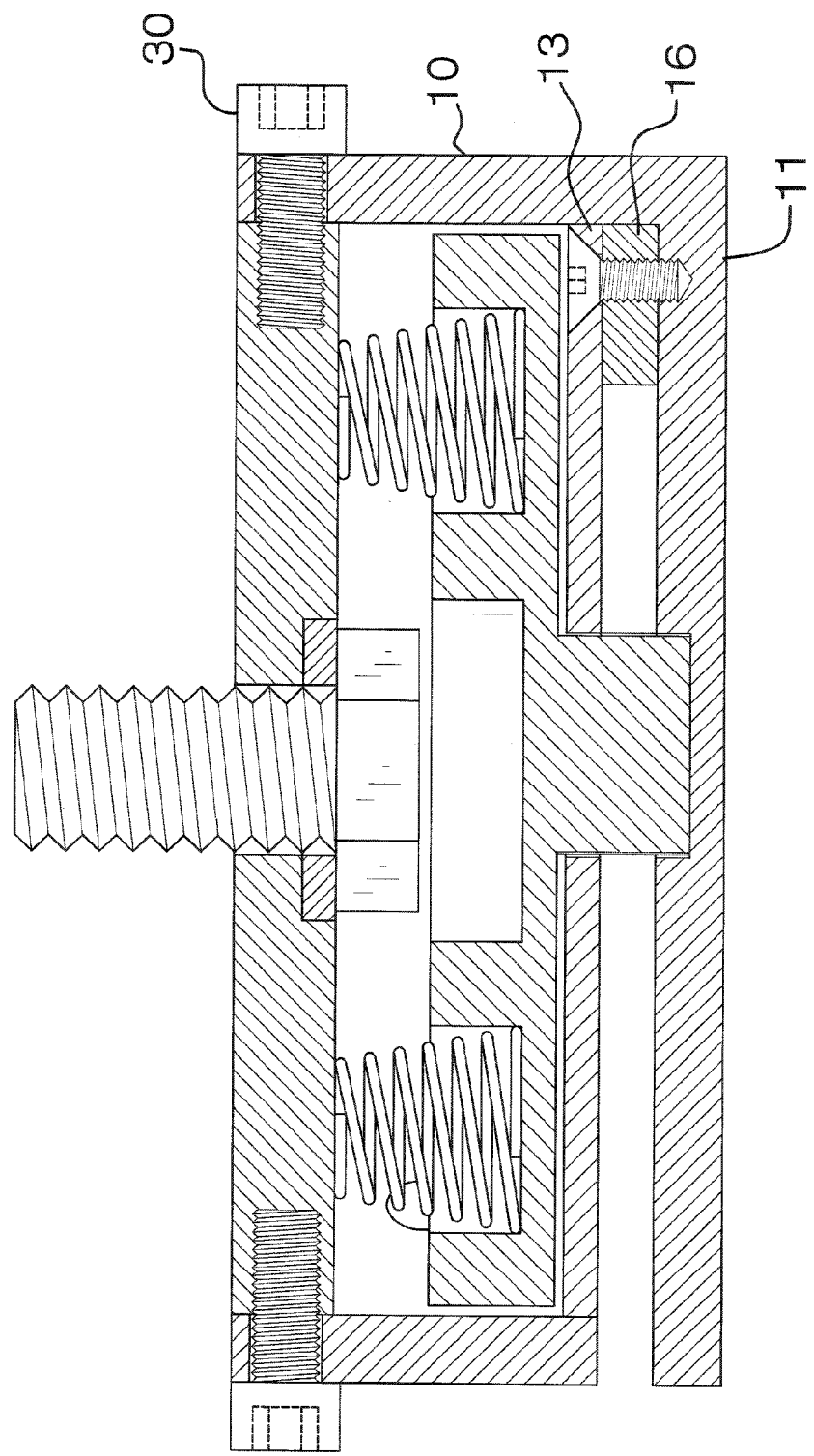
FIG. 7 depicts a vertical cross section view of the carrier of FIG. 2, at plane 7-7 of FIG. 10.
Figure 8:
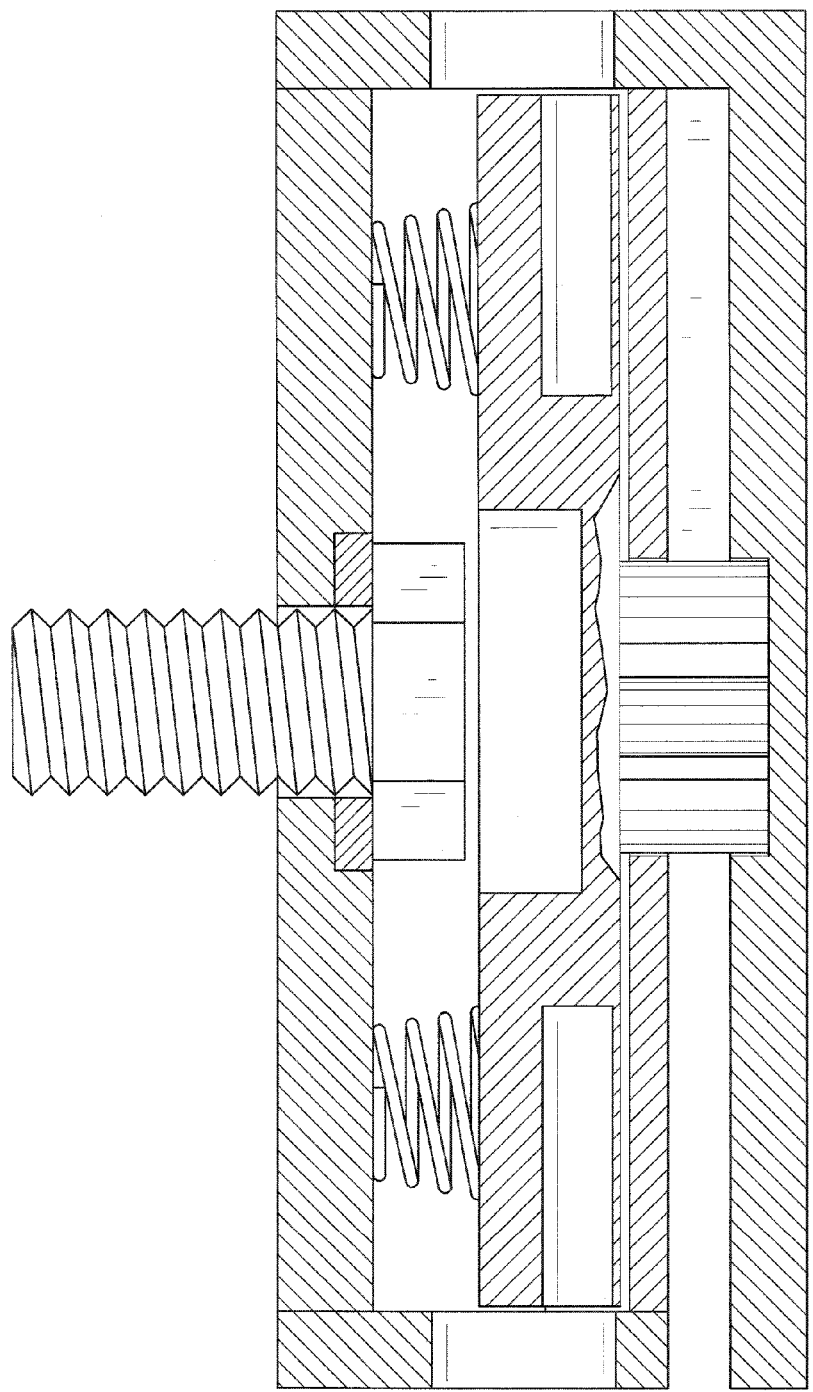
FIG. 8 depicts a vertical cross section view of the carrier of FIG. 2, at plane 8-8 of FIG. 10, with a lever-like object (not shown) leveraging the downwardly spring-biased disk (with downstanding star-shaped tip) upwardly against the compression spring to elevate the star-shaped tip from the channel sufficient to allow blade removal or insertion
Figure 9:
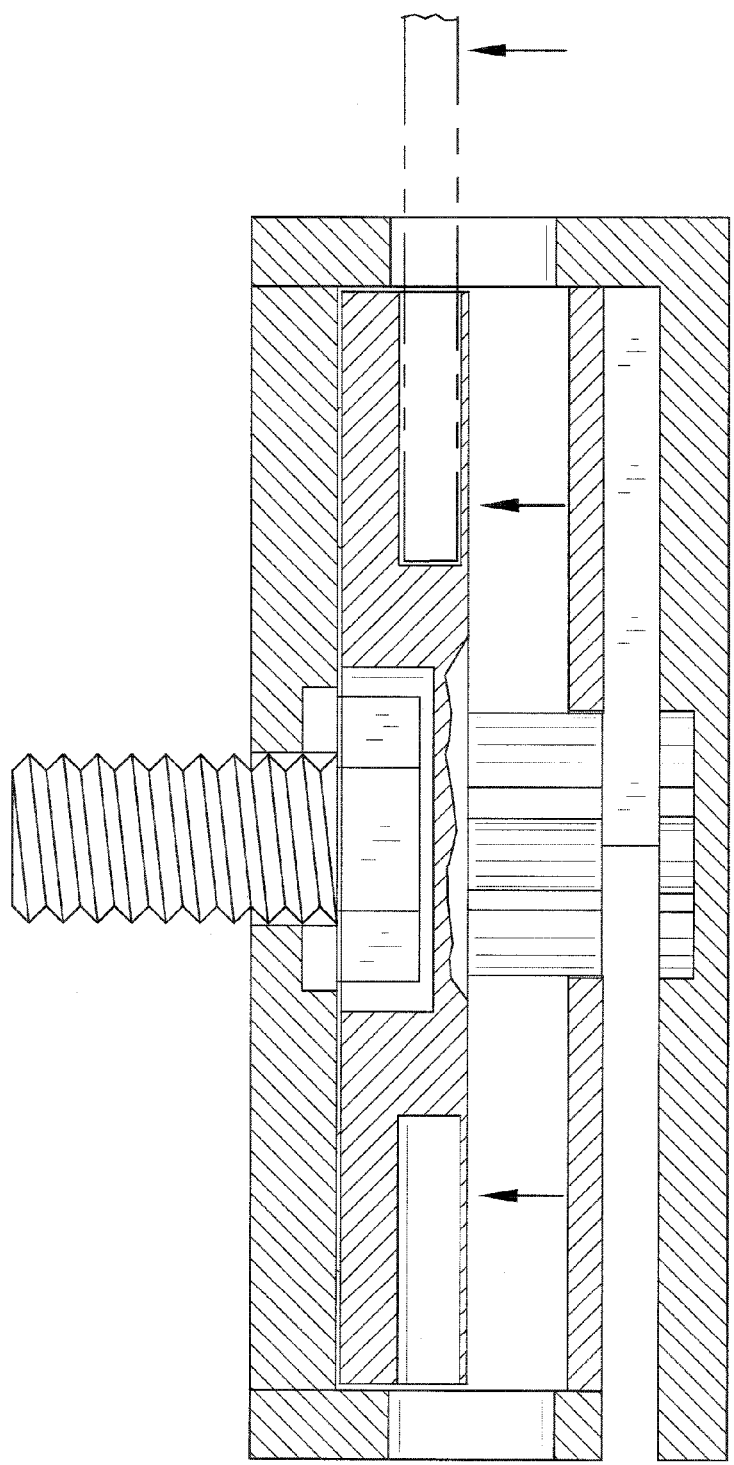
FIG. 9 depicts the carrier of FIG. 8, with a lever-like object (in phantom, not claimed) leveraging the disk upwardly against the compression springs (within the indentations) to elevate the star-shaped tip from the channel sufficient to allow blade removal or insertion. Also depicted is an axial void in the upper surface of the bottom (with which the downstanding axial tip may seat in the lowered position), an optional feature.
Figure 10:
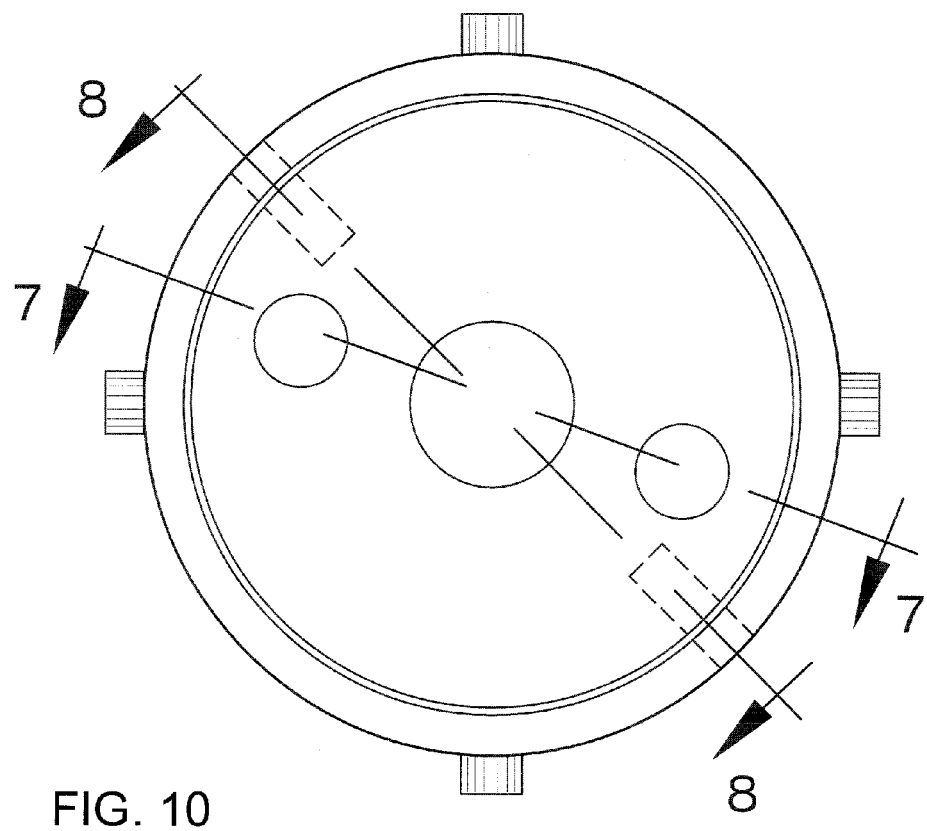
FIG. 10 depicts a top plan view of the carrier housing of FIG. 11.
Figure 11:
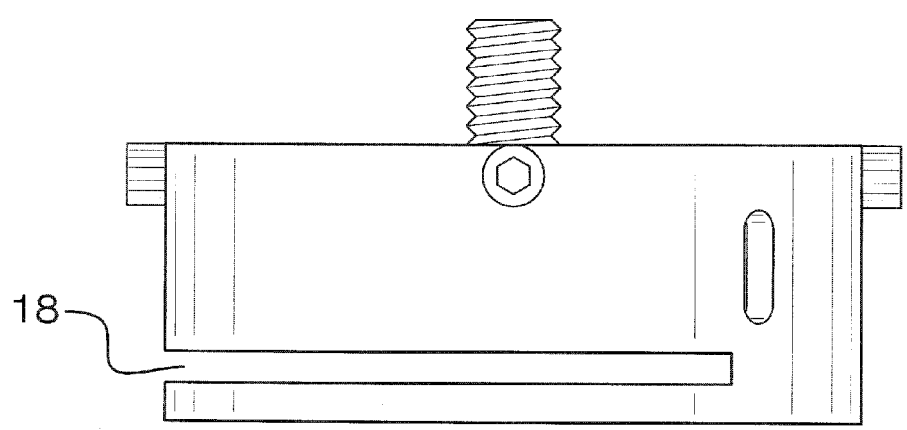
FIG. 11 depicts a side elevation of the carrier of FIG. 10.
Figure 12:
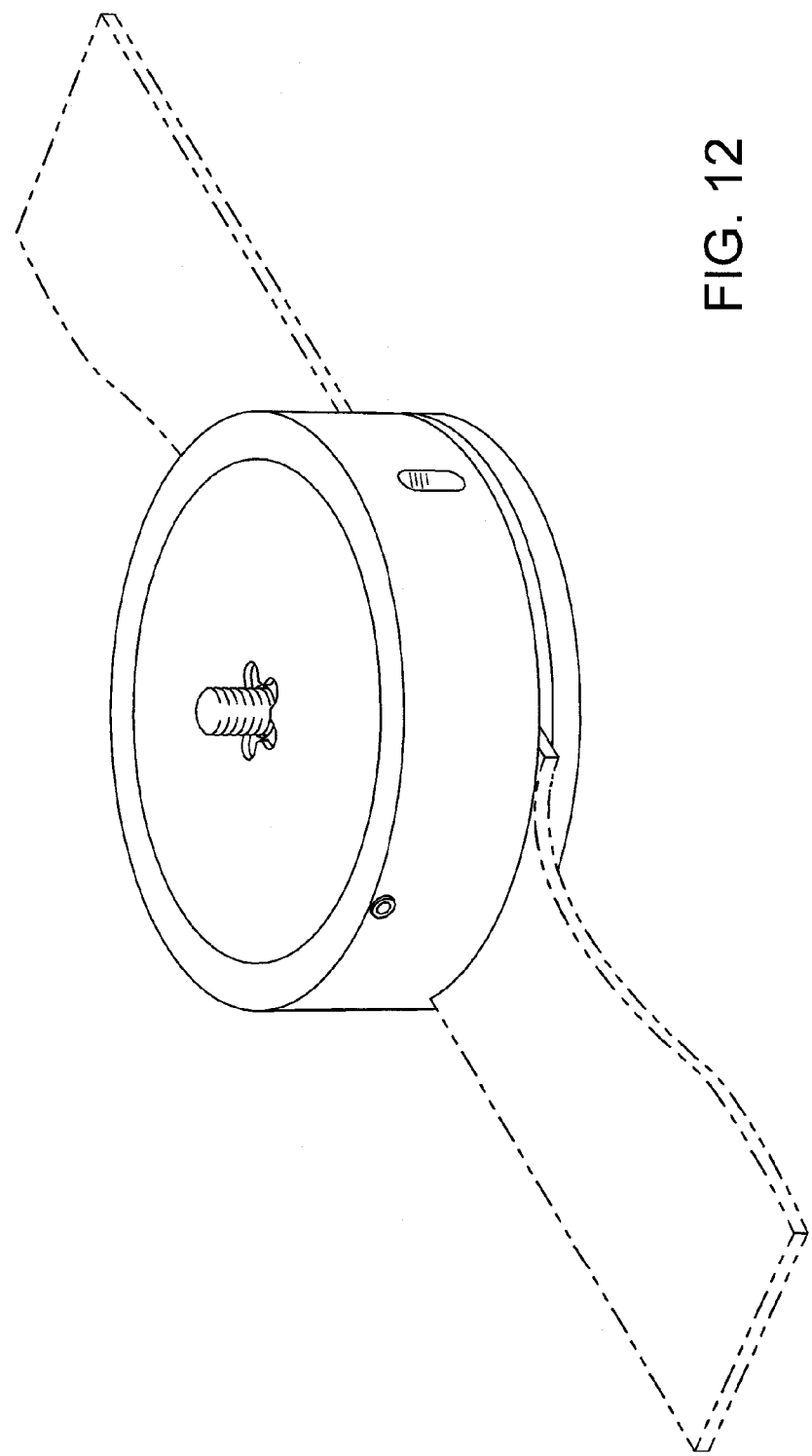
FIG. 12 depicts a perspective overview of another embodiment having a longer drive bolt that extends downwardly; the blade is unclaimed.
Figure 13:
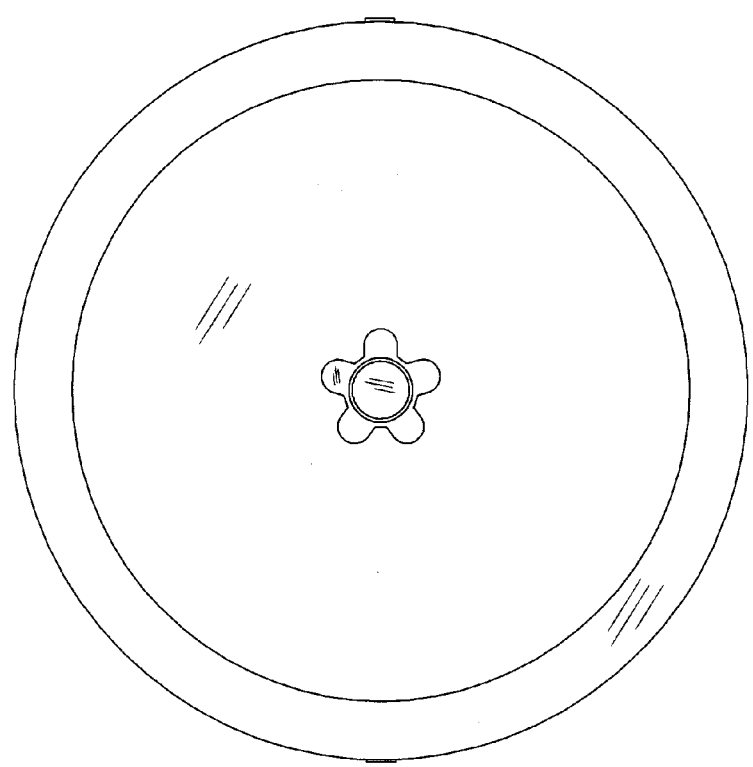
FIG. 13 depicts a top plan view of the carrier of FIG. 12.
Figure 14:
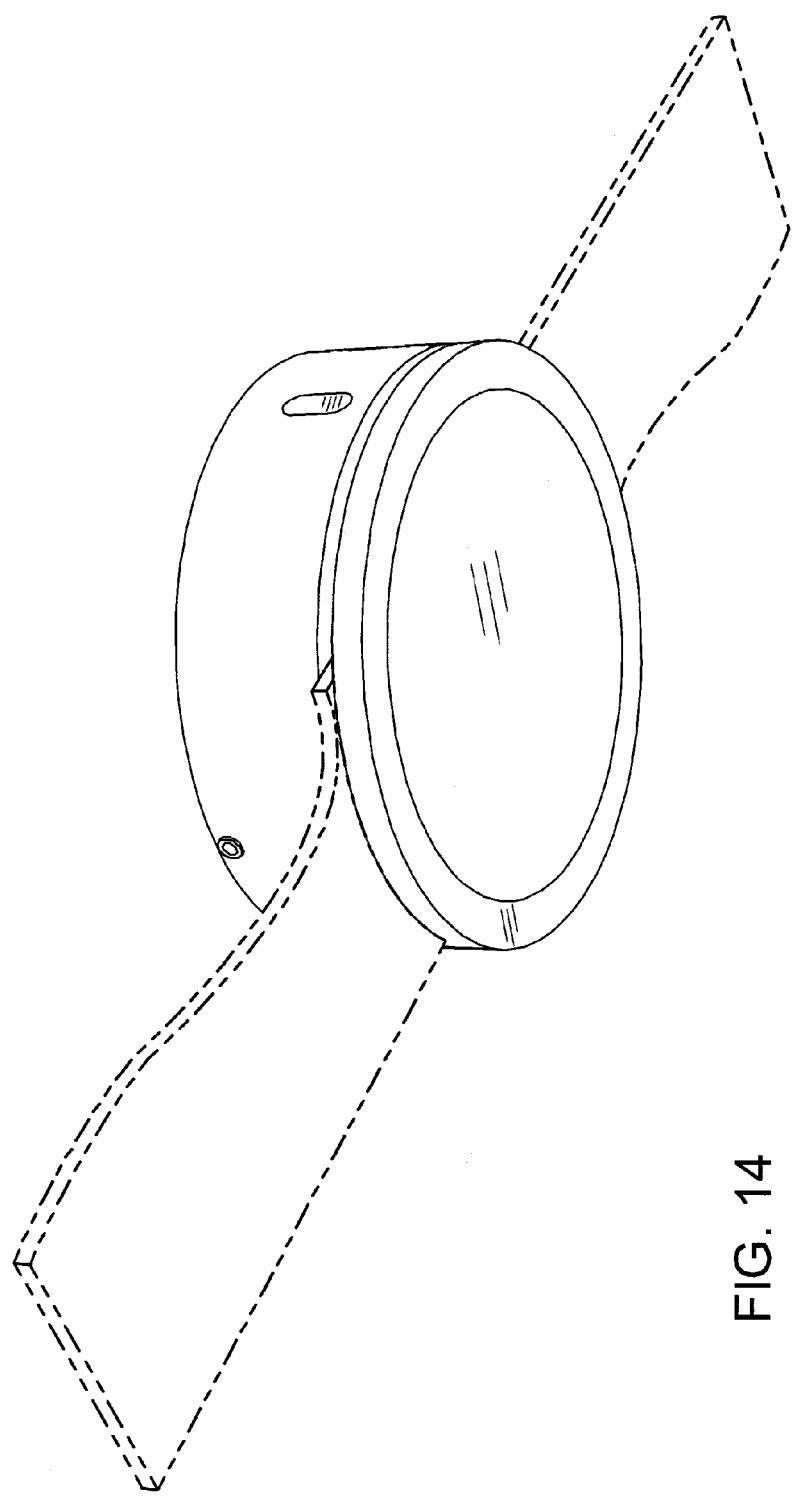
FIG. 14 depicts an underside perspective view of the carrier of FIG. 12.
Figure 15:
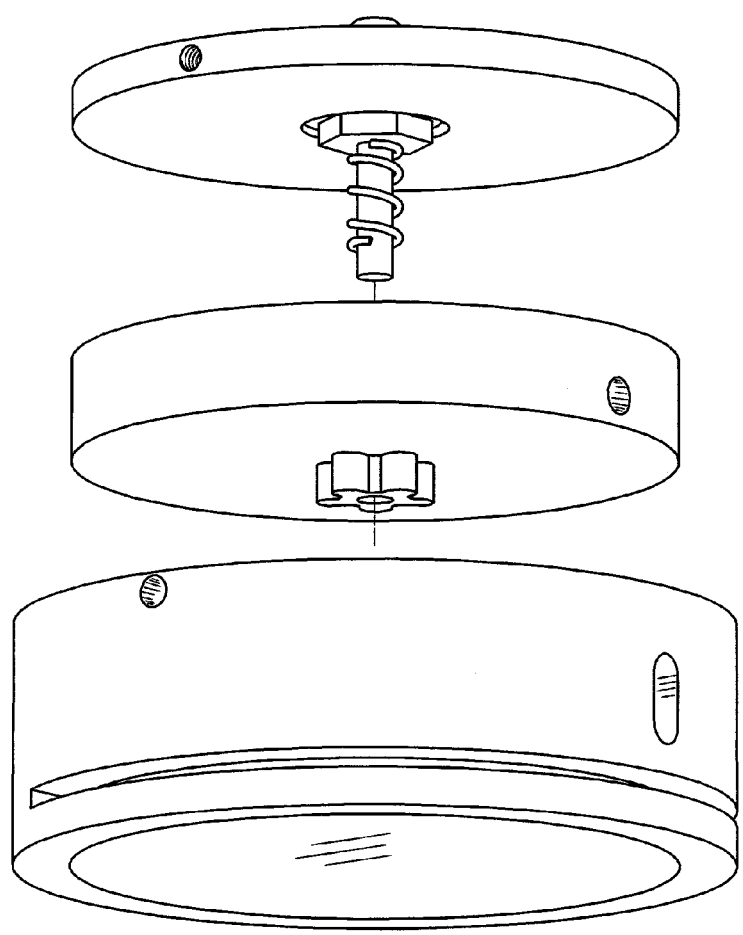
FIG. 15 depicts the main parts of the embodiment of the carrier of FIG. 12, namely, the housing, disk, compression spring, and cap with drive bolt inserted.
Figure 16:
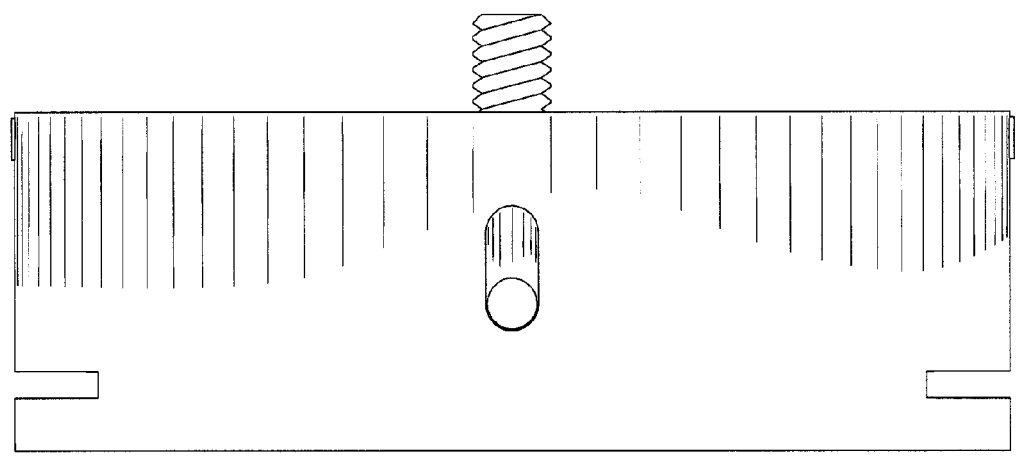
FIG. 16 depicts a side elevation view of the carrier of FIG. 12.
Figure 17:
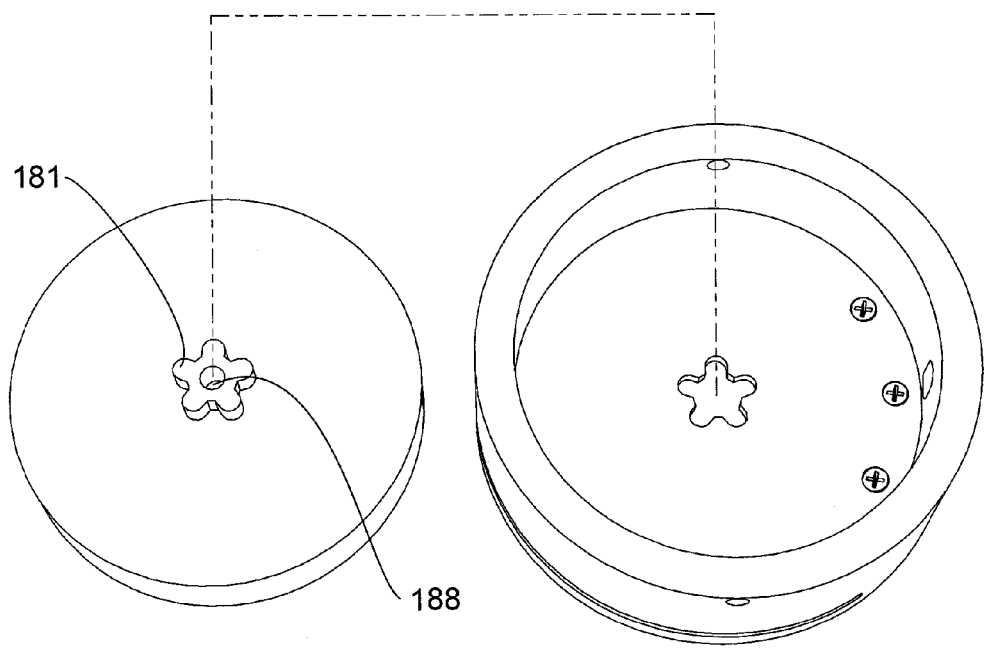
FIG. 17 depicts a view of the underside of the disk, with the star-shaped tip (181) and an axial opening (188), together with an upper perspective view of the housing.
Figure 18:
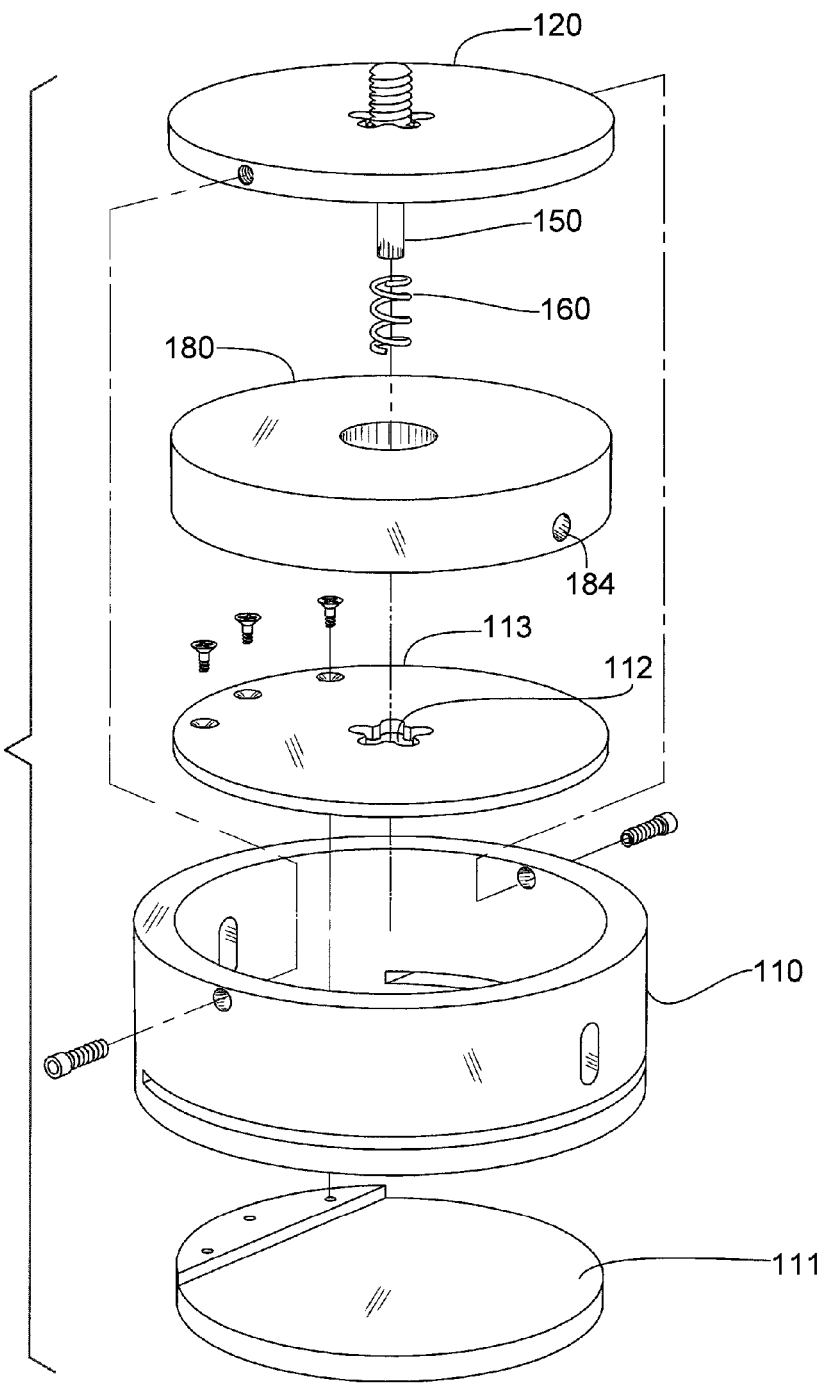
FIG. 18 depicts the carrier of FIG. 12 disassembled, including the housing 110 having a false floor (113) with an axial opening (112); also depicted are the cap (120) with a drive bolt (150) impaling a compression spring (160), and floating disk (180) with a lever bore (184) for accepting a lever for leveraging the disk upward to its raised position. The upper surface of the bottom (111), within the channel, is also shown.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply:

The term "accept" or derivative thereof essentially means sized to allow an identified item to fit within with only slight leeway, so as to support or guide without binding.

The term "housed" or derivative thereof essentially means enclose, wholly or partially sufficient to perform the function required by the context of usage.

Directional terms such as "upward" or "downward" (or derivatives thereof) are intended merely as guides within the context of a device used in connection with an essentially vertical rotary drive shaft having its free end extending downward; in the context of an essentially horizontal drive shaft, those terms will change to the extent needed to reflect the change in orientation of the device.

Also for the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by construction materials to the extent that such materials satisfy the structural and/or functional requirements. For example, any material may be used so long as it satisfies the function for which it is being used, such as providing the structural strength and durability to both lock the blade into the carrier sufficiently strong for operation of the blade, while allowing ready removal of the blade when desired.

Similarly, the invention is not limited to any particular embodiment described or depicted herein. For example, other versions than those specifically disclosed herein will suffice, so long as each embodies the required elements or limitations.

The invention is essentially a quick-change blade carrier for a rotary mower having a drive shaft with an internally threaded bore. The carrier includes a housing linked by its cap to the mower's drive shaft, and enclosing a blade-engagement member having a blade-engaging tip downstanding from its floor and a spring to bias the member (and tip) downward through a center hole in the blade held within a channel in the bottom of the housing. More particularly, the carrier includes:
1. an essentially cylindrical housing having a bottom and a false floor and a sidewall slot-opening forming a channel therebetween holding the blade;
2. an essentially circular cap snugly anchorable within the housing, and having a central aperture receiving a fastening means (drive-bolt) for screwing snugly into the bore of the drive shaft;
3. a housed disk having a non-round-shaped tip downstanding from its underside; and
4. a housed locking means including a compression spring, biasing the disk (and blade-engaging tip) through a non-round-shaped opening in the housing's false floor and through a non-round-shaped center hole in the blade to lock it within the channel.

These are the basic elements or limitations of the invention, although other features may be available. An example of such an additional element includes a centralized non-round-shaped indent in the bottom of the housing, for seating the star-shaped tip downstanding from the underside of the disk and extending through a star-shaped opening in the center of the blade.

Several embodiments are disclosed, primarily divided into those relating to a version having a shorter drive bolt with an essentially standard flattened head, and a version having a longer drive bolt capable of both firmly fastening the device's cap to the rotary draft shaft and having sufficient length below the cap to align a compression spring along the axis of the device. Typically the long-bolt version requires only one compression spring, although additional compression springs (that are not impaled by the drive bolt) may be added in a manner done for the short-bolt version.

Both versions include a device facilitating removal and mounting of a blade having an axial mounting hole for powering by a rotary drive shaft, the device may include (having or including) a housing having a bottom, a false floor defining an axial opening having the configuration of the blade's mounting hole, and a sidewall slot-opening defining a channel accepting the central portion of the blade between the housing bottom and false floor, the axial opening of the false floor defining a passageway into the channel. Also included is a housed blade-lock member having an axial tip snugly acceptable to the axial opening, downstanding to the axial opening when the blade-lock member is in a second raised position; it is also downstanding substantially into the channel and through the blade's axial hole when the member is in a first lowered position. The housing sidewall may further include a lever port for accepting a lever for raising the blade-lock member to the raised position. Also included is a locking means for biasing the blade-lock member's tip to the first lowered position and locking the blade into the channel. There is also a cap having a fastening means linking the device to the rotary drive shaft.

More particularly, the locking means may include at least one compression spring between the cap and the blade-lock member, biasing the blade-lock member downward to the first lowered position. The housed blade-lock member may include a disk housed within a cylindrical housing. The cap may include an axial aperture accepting a drive-bolt rotatably fastened within the rotary drive shaft's internally threaded axial bore; the circumference of the cap should be anchored firmly within the housing.

If the blade has an axial mounting hole having a non-round configuration (such as a square, hexagonal, octagonal, or lobed opening), the housing false floor should defines a non-round axial opening having the configuration of the blade's non-round mounting hole. The housed blade-lock disk should also have a non-round axial tip snugly acceptable to the axial opening and the blade's axial mounting hole, so that it can snugly impale both the false floor and blade to lock the blade into the channel of the carrier device.

Primarily in the short-bolt version of the invention, the disk has an upper surface defining a plurality of indentations, each accepting the base of a compression spring seated therein. The compression spring may be cylindrical, conical, or any other configuration sufficient to perform its function of biasing the blade-locking member (the "floating" disk) in the downward (locking) position with its downstanding tip extending through the blade's axial mounting hole. The disk's upper surface may also define an axial well sized to accept the head of the drive-bolt when the disk is in the raised position. This configuration has the advantage of allowing the housing to have a "lower profile".

If the rotary drive shaft has a non-round cross section (besides having an internally threaded bore for accepting the device's drive bolt), the device's cap may further include an upper surface having an axial void snugly acceptable to that non-round end of the rotary drive shaft. This will assist in translating the rotation of the drive shaft to rotation of the cap (and anchored housing), which will in turn assist in rotation of the blade locked within the device's channel.

In the short-bolt version, to attach the device to the mower, the user threads the drive-bolt upward through the central aperture of the housing cap, and screws it into the internally threaded bore of the mower's rotary drive shaft; the head of the drive bolt is seated snugly against the underside of the housing cap. (Common hardware and techniques may be used wherever applicable in this device, such as such as lock-washers and/or countersinking.) The compression springs are then inserted into the indentations in the upper surface of the blade-lock disk within the housing. The user then anchors the cap within the housing, using bolts running through the housing sidewall and into the perimeter of the cap within the housing. (Common techniques and hardware may be used as applicable in the device, such as using bolts with low profile heads and/or countersinking them into the housing sidewall so that the bolts do not protrude too much.) In this resting state, the springs bias the disk downward, causing its axial tip to extend through the corresponding axial opening in the false floor of the housing, far enough to extend through the corresponding axial mounting hole of any blade situated within the channel between the false floor and bottom of the housing.

In the long-bolt version (with the longer drive bolt impaling the compression spring and aligning it with the axis of the device), the blade-lock disk may further include an axial portal; the drive bolt may therefore extend through the compression spring and into the portal. This will also allow the blade-lock disk to be leveraged upward more without being stopped by the drive bolt. Depending upon the configuration of the axial tip downstanding from the underside of the disk, the axial portal may or may not extend entirely through the disk (and axial tip). Moreover, in this version, the drive bolt also has a nut rotatably fastened upwardly until firmly against the underside of the cap, allowing it to both link the cap to the rotary drive shaft and align the compression spring with the axis of the device.

To attach the invention to the mower, the user threads the longer drive-bolt through the central aperture of the housing cap, and screws it into the internally threaded bore of the mower's rotary drive shaft; a nut is screwed up the opposite end of the drive-bolt, until the nut is seated snugly against the underside of the housing cap. (Common hardware such as lock-washers may be used wherever applicable, in this device.) The compression spring is then threaded over the drive-bolt until it abuts the nut, and the end of the drive-bolt is threaded through a center hole of the disk (to center the spring against the upper surface of the disk, surrounding any axial port therein). The non-round-shaped tip downstanding from the underside of the disk is inserted through a correspondingly non-round-shaped opening in false floor of the housing. The user then anchors the cap within the housing, using bolts running through the housing sidewall and into the perimeter of the cap within the housing. (Common techniques and hardware may be used as applicable in the device, such as using bolts with low profile heads and/or countersinking them into the housing sidewall so that the bolts do not protrude too much.) In this resting state, the spring biases the disk downward, causing its axial tip to extend through the corresponding axial opening in the false floor of the housing, far enough to extend through the corresponding axial mounting hole of any blade situated within the channel between the false floor and bottom of the housing.

A more preferred embodiment for a device facilitating mounting and removal of a blade having an axial mounting hole for powering by a rotary drive shaft, the device may include:

(a) a cylindrical housing having a bottom, a false floor defining an axial opening having the configuration of the blade's mounting hole, and a sidewall slot-opening defining a transverse channel accepting the blade between the housing bottom and false floor, the axial opening defining a passageway into the channel;

(b) a housed blade-lock disk including an underside including an axial tip snugly acceptable to the axial opening, downstanding to the axial opening when the blade-lock disk is in a raised position, and downstanding substantially into the channel and through the blade's axial hole when the disk is in a lowered position, the housing sidewall further including a lever port for accepting a lever for raising the blade-lock disk to the raised position; and (c) a cap having a fastening means including an axial aperture accepting a drive-bolt rotatably fastened within the rotary drive shaft's internally threaded axial bore and firmly linking the cap thereto, the circumference of the cap anchored within the housing.

The housed blade-lock disk may further include an axial tip having a non-round cross section configuration snugly acceptable to a blade's non-round mounting hole, and may further include an upper surface defining a plurality of indentations, each accepting the base of a compression spring seated therein to bias the disk towards a lowered position, the upper surface also defining an axial well, and wherein the head of the drive-bolt is accepted within the axial well when the blade-lock disk is in the raised position.

Alternatively, the housed blade-lock disk may further include an axial tip having a non-round cross section configuration snugly acceptable to a blade's non-round mounting hole, and may further include an upper surface defining an axial portal, the drive bolt further extending through the compression spring and into the portal, the drive bolt having a nut rotatably fastened upwardly until firmly against the underside of the cap.

The axial tip may have a non-round cross section configuration snugly acceptable to corresponding blade hole configurations known in the mower blade industry. More particularly, the axial tip may have a non-round cross section resembling a 5-lobed star-shaped configuration snugly acceptable to a corresponding blade hole configuration known in the mower blade industry.

Besides the device disclosed herein, the invention includes a method of using the device installed on a rotary drive shaft for mounting a blade having an axial mounting hole. Such method of must may include the steps of:

(a) inserting a lever into the lever port of the device, and leveraging the blade-lock disk to a raised position;

(b) aligning the blade in the housing's channel so that the blade's axial mounting hole is aligned with the axial tip of the blade-lock disk; and (c) releasing the leverage and removing the lever from the lever port.

The method may further include removing the blade from the device by the following steps:

(a) inserting a lever into the lever port of the device, an leveraging the blade-lock disk to a raised position;

(b) removing the blade; and (c) releasing the leverage and removing the lever from the lever port.

To insert a blade into the channel or remove it from the channel, the user grasps a screw driver (or similar lever-like object) and inserts the tip into an elongated hole in the housing sidewall, then leverages the disk upward (against the compression spring) to thereby withdraw the star-shaped tip from the channel. Discontinuation of the leveraging causes the spring to again push the disk downward, the star-shaped tip again extending into the channel (and locking into place any blade positioned therein).

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A device facilitating removal and mounting of a blade having an axial mounting hole for powering by a rotary drive shaft, the device comprising:

(a) a housing having a bottom, a false floor defining an axial opening having the configuration of the axial mounting hole of the blade, and the housing having a sidewall slot-opening defining a channel accepting a central portion of the blade between the housing bottom and false floor, said axial opening of the false floor defining a passageway into said channel;

(b) a blade-lock member having an axial tip acceptable to said axial opening, the axial tip downstanding toward said axial opening when said blade-lock member is in a raised position, and downstanding substantially into said channel and through the axial mounting hole of the blade when said blade-lock member is in a lowered position, said housing sidewall further comprising a lever port for accepting a lever for raising said blade-lock member to the raised position; and (c) a locking means comprising at least one compression spring between the cap and the blade-lock member for biasing the axial tip of the blade-lock member to the lowered position and locking the blade into said channel; and (d) a cap having a fastening means comprising an axial aperture accepting a drive-bolt which is rotatably fastened within a threaded axial bore of the rotary drive shaft linking the device to the rotary drive shaft.

2. The device of claim 1, said blade-lock member comprising a disk housed within a cylindrical housing, the circumference of said cap anchored within said housing.

3. The device of claim 2, said disk having an upper surface defining a plurality of indentations, each indentation accepting the base of one of said at least one compression spring seated therein.

4. The device of claim 3, said disk further comprising an upper surface defining an axial well accepting the head of the drive-bolt when said disk is in said raised position.

5. The device of claim 2, said blade-lock member further comprising an axial portal, said drive-bolt extending through said at least one compression spring and into said portal, said drive bolt having a nut rotatably fastened against the underside of the cap.

6. The device of claim 1, said housing false floor defining a non-round axial opening having the configuration of a non-round mounting hole of the blade, the axial tip of the blade-lock member having a non-round shape acceptable to said non-round axial opening of the false floor.

7. The device of claim 1, said cap further comprising an upper surface having an axial void acceptable to a non-round end of the rotary drive shaft.

8. A device facilitating mounting and removal of a blade having an axial mounting hole for powering by a rotary drive shaft, the device comprising:
   (a) a cylindrical housing having a bottom, a false floor defining an axial opening having the configuration of the axial mounting hole of the blade, and a sidewall slot-opening defining a transverse channel accepting the blade between the bottom and false floor, said axial opening defining a passageway into said channel;
   (b) a blade-lock disk comprising an underside including an axial tip acceptable to said axial opening, the axial tip downstanding toward said axial opening when said blade-lock disk is in a raised position, and the axial tip downstanding into said channel and through the axial mounting hole of the blade when said disk is in a first lowered position, said housing sidewall further comprising a lever port for accepting a lever for raising said blade-lock disk to the raised position;
   (c) a cap having a fastening means comprising an axial aperture accepting a drive-bolt rotatably fastened within an internally threaded axial bore of the rotary drive shaft and firmly linking said cap thereto, the circumference of said cap anchored within said housing; and
   (d) at least one compression spring between the cap and the blade-lock member for biasing the axial tip of the blade-lock disk to the lowered position and locking the blade into said channel.

9. The device of claim 8, wherein the axial tip of said blade-lock disk comprises a non-round cross section and the axial mounting hole of the blade comprises a corresponding non-round cross section, and the blade-lock disk further comprising an upper surface defining a plurality of indentations, each indentation accepting the base of one of said at least one compression spring seated therein to bias the blade-lock disk towards the lowered position, said upper surface also defining an axial well, and wherein the head of the drive-bolt is accepted within the axial well when the blade-lock disk is in the raised position.

10. The device of claim 9, said axial tip having a non-round cross section comprising a 5-lobed star-shaped configuration.

11. The device of claim 8, wherein the axial tip of said blade-lock disk comprises a non-round cross section and the axial mounting hole of the blade comprises a corresponding non-round cross section, and the blade-lock disk further comprising an upper surface defining an axial portal, said drive bolt further extending through said at least one compression spring and into said portal, said drive bolt having a nut rotatably fastened against the underside of the cap.

12. The device of claim 11, said axial tip having a non-round cross section comprising a 5-lobed star-shaped configuration.

13. A method of using a device facilitating mounting and removal of a blade having an axial mounting hole for powering by a rotary drive shaft, the method comprising:
   (a) providing the device of claim 8;
   (b) inserting a lever into the lever port of the device, and leveraging the blade-lock disk from the lowered position to the raised position;
   (c) aligning the blade in the channel of the housing such that the axial mounting hole of the blade is aligned with the axial tip of the blade-lock disk; and
   (d) releasing the leverage and removing the lever from the lever port allowing the blade-lock disk to return to the lowered position and secure the blade.

14. The method of claim 13, further comprising removing the blade from the device by the following steps:
   (a) inserting a lever into the lever port of the device, and leveraging the blade-lock disk from the lowered position to the raised position;
   (b) removing the blade; and
   (c) releasing the leverage and removing the lever from the lever port allowing the blade-lock disk to return to the lowered position.

* * * * *